US012705807B2

(12) United States Patent
Zhou et al.

(10) Patent No.: US 12,705,807 B2
(45) Date of Patent: Aug. 11, 2026

(54) IMAGE PROCESSING METHOD AND TRAINING METHOD BASED ON GENERATIVE ADVERSARIAL NETWORK, ELECTRONIC DEVICE, AND MEDIUM

(71) Applicant: Beijing Zitiao Network Technology Co., Ltd., Beijing (CN)

(72) Inventors: Siyu Zhou, Beijing (CN); Qian He, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 78 days.

(21) Appl. No.: 18/569,917

(22) PCT Filed: May 24, 2022

(86) PCT No.: PCT/CN2022/094586
§ 371 (c)(1),
(2) Date: Dec. 13, 2023

(87) PCT Pub. No.: WO2023/273697
PCT Pub. Date: Jan. 5, 2023

(65) Prior Publication Data

US 2024/0273794 A1 Aug. 15, 2024

(30) Foreign Application Priority Data

Jun. 30, 2021 (CN) ......................... 202110737811.X

(51) Int. Cl.
*G06T 11/60* (2026.01)

(52) U.S. Cl.
CPC .... *G06T 11/60* (2013.01); *G06T 2207/20081* (2013.01); *G06T 2207/20084* (2013.01); *G06T 2207/30201* (2013.01)

(58) Field of Classification Search
CPC ...................................................... G06T 11/60
See application file for complete search history.

(56) References Cited

U.S. PATENT DOCUMENTS

2019/0251674 A1* 8/2019 Chang ................... G06N 3/045
2019/0385290 A1 12/2019 Yang
(Continued)

FOREIGN PATENT DOCUMENTS

CN 107945188 A 4/2018
CN 108898546 A 11/2018
(Continued)

OTHER PUBLICATIONS

Office Action issued in Chinese Patent Application No. 202110737811.X, Jan. 20, 2023, with English translation (15 pages).
(Continued)

*Primary Examiner* — Shivang I Patel
(74) *Attorney, Agent, or Firm* — Astute IP Law Group

(57) ABSTRACT

Embodiments of the present disclosure disclose an image processing method, a training method for an image processing model, an electronic device and a medium. The image processing method comprises: inputting an image to be processed into an image processing model in response to a special effect trigger instruction; and outputting a target image from the image processing model, wherein the target image comprises a special effect object and a conflicting object corresponding to the special effect object is removed in the target image, wherein the image processing model is trained based on an image with the conflicting object removed and a target object superimposed, wherein the target object comprises an adjustable object having a same presentation effect as the special effect object, and the image with the conflicting object removed is generated by a generator trained based on a generative adversarial network.

18 Claims, 3 Drawing Sheets

In response to a special effect trigger instruction, input an image to be processed into an image processing model

110

Output, by the image processing model, a target image on which a special effect object is comprised and a conflicting object corresponding to the special effect object is removed

120

(56) References Cited

U.S. PATENT DOCUMENTS

| | | | |
|---|---|---|---|
| 2021/0065454 A1 | 3/2021 | Goodrich et al. | |
| 2021/0065464 A1* | 3/2021 | Goodrich | G06T 15/50 |
| 2023/0245398 A1 | 8/2023 | Zhang et al. | |

FOREIGN PATENT DOCUMENTS

| | | |
|---|---|---|
| CN | 109727320 A | 5/2019 |
| CN | 110136054 A | 8/2019 |
| CN | 110288523 A | 9/2019 |
| CN | 110913205 A | 3/2020 |
| CN | 111325657 A | 6/2020 |
| CN | 111563855 A | 8/2020 |
| CN | 111833461 A | 10/2020 |
| CN | 112381717 A | 2/2021 |
| CN | 112489169 A | 3/2021 |
| CN | 112699816 A | 4/2021 |
| CN | 113344776 A | 9/2021 |
| WO | 2020/258668 A1 | 12/2020 |
| WO | 2021/023003 A1 | 2/2021 |
| WO | 2023/273697 A1 | 1/2023 |

OTHER PUBLICATIONS

Notification of Grant issued in Chinese Patent Application No. 202110737811.X, May 29, 2023, with English translation (3 pages).

International Search Report and Written Opinion, International Patent Application No. PCT/CN2022/094586, Aug. 18, 2022, with English translation (16 pages).

* cited by examiner

IMAGE PROCESSING METHOD AND TRAINING METHOD BASED ON GENERATIVE ADVERSARIAL NETWORK, ELECTRONIC DEVICE, AND MEDIUM

CROSS-REFERENCE TO RELATED APPLICATIONS

The present disclosure is a U.S. National Stage Application under 35 U.S.C. § 371 of International Patent Application No. PCT/CN2022/094586, filed on May 24, 2022, which is based on and claims priority of Chinese application for invention No. 202110737811.X, filed on Jun. 30, 2021, the disclosures of both of which are hereby incorporated into this disclosure by reference in its entirety.

TECHNICAL FIELD

Embodiments of the present disclosure relate to a field of image processing, particularly to an image processing method and apparatus, a training method and apparatus for an image processing model, an electronic device, and a medium.

BACKGROUND

With the development of technology, more and more applications (Apps) have entered our daily lives. Currently, some Apps can support a special effect for a facial image beautification, which is very popular with users.

In related technologies, when an App performs a facial image beautification, it typically extracts special effect data from a special effect database based on a selected special effect and applies the special effect data to locations corresponding to the special effect data on a facial image.

SUMMARY

Embodiments of the present disclosure provide an image processing method and apparatus, a training method and apparatus for an image processing model, an electronic device and a medium.

In a first aspect, embodiments of the present disclosure provides an image processing method, comprising:

inputting an image to be processed into an image processing model in response to a special effect trigger instruction; and outputting a target image from the image processing model, wherein the target image comprises a special effect object and a conflicting object corresponding to the special effect object is removed in the target image, wherein the image processing model is trained based on an image with the conflicting object removed and a target object superimposed, wherein the target object comprises an adjustable object having a same presentation effect as the special effect object, and the image with the conflicting object removed is generated by a generator trained based on a generative adversarial network.

In a second aspect, an embodiment of the present disclosure provides a model training method, comprising:

inputting an original image into a first generator to generate a first image with a conflicting object removed by the first generator, wherein the conflicting object corresponds to a special effect object;

inputting the first image into a second generator to generate a second image comprising the special effect object by the second generator;

generating a target object based on the special effect object in the second image, and superimposing the target object on the first images to obtain a third image, wherein the target object comprises an adjustable object having a same presentation effect as the special effect object; and training the image processing model based on the original image and the third image, wherein the first generator and the second generator are trained together with a generative adversarial network.

In a third aspect, an embodiment of the present disclosure provides an electronic device, comprising:

one or more processors;

a storage device for storing one or more programs, which when executed by the one or more processors cause the one or more processors to implement the image processing method or the training method for an image model according to any one of the embodiments of the present disclosure.

In a fourth aspect, an embodiment of the present disclosure further provides a storage medium containing computer executable instructions for executing the image processing method or the training method for an image model as described in any embodiment of the present disclosure when executed by a computer processor.

BRIEF DESCRIPTION OF THE DRAWINGS

Throughout drawings, same or similar reference signs indicate same or similar elements. It should be understood that the drawings are schematic and components and elements are not necessarily drawn to scale.

DETAILED DESCRIPTION

Exemplary embodiments of the present disclosure will now be described in detail with reference to the drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that various steps described in methods of the embodiments of the present disclosure may be executed in a different order, and/or executed in parallel.

In addition, the methods may comprise additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The inventors have found that the related technologies may lead to a poor authenticity of a special effect image obtained by applying the special effect data to the facial image and an insufficient guarantee of a beautification effect.

Figure 1:
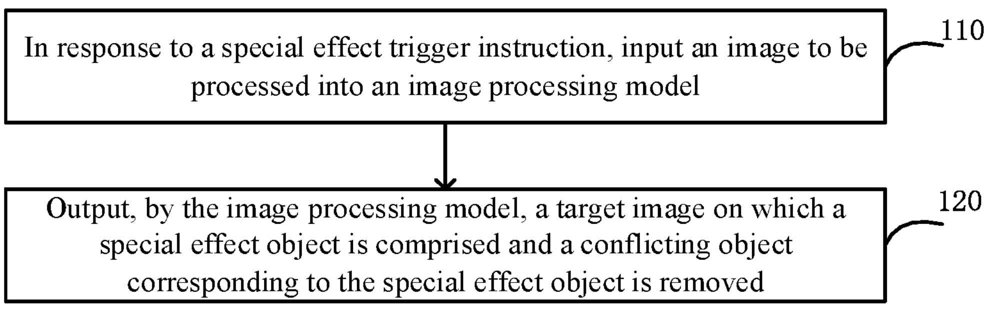
FIG. 1 is a flowchart of an image processing method provided in an embodiment of the present disclosure.

FIG. 1 is a flowchart of an image processing method provided in an embodiment of the present disclosure. Embodiments of the present disclosure are applicable to a case of image processing, such as facial image beautification. This method can be performed by an image processing apparatus, which can be implemented in the form of software and/or hardware. The apparatus can be integrated into application software and installed together with the application software in electronic devices such as mobile phones, computers and other electronic devices.

As shown in FIG. 1, the image processing method provided in an embodiment of the present disclosure comprises the following steps.

In S110, an image to be processed is input into an image processing model in response to a special effect trigger instruction.

An apparatus for executing the image processing method provided in the embodiment can be integrated into an application software that supports an image processing function, and can be installed in an electronic device such as a mobile phone and a computer together with the application software. Wherein, the application software may be a multimedia application related to images/videos, such as an image/video acquisition software, an image/video processing software, a multimedia sharing software, and a multimedia communication software, etc., which are not exhaustive here.

When such an application is executed on an electronic device, a special effect trigger instruction can be received via a user interface provided by the application. After receiving the special effect trigger instruction, the application can instruct an image processing apparatus to perform the image processing method. The special effect trigger instruction is an instruction to trigger an implement of a special effect to an image/video. The special effect trigger instruction can carry a special effect identifier. A special effect identifier can uniquely represent a corresponding special effect. The special effect may comprise, but are not limited to, a special effect that add a virtual object and/or remove a real object from an image. As an example, if the application is used for the facial image beautification, the special effect may comprise, but are not limited to, adding an aegyo sal, adding a double eyelid, adding a dimple, removing an eye wrinkle, removing a smile line, etc.

The image to be processed may be an image collected by the application software, or an image stored in a memory of an electronic device and read by the application software. When the application software obtains the image to be processed and receives the special effect trigger instruction, the image can be used as a parameter to call the image processing apparatus to execute a special effect processing on the image.

The image processing model may be a pre-trained machine learning model. For example, a machine learning model pre-trained on a server of the application software. Once the training is complete, the server can distribute the machine learning model to the application software for image processing. An image processing model corresponding to each of special effects can be trained on the server, which means that the application software can receive multiple image processing models. In response to the application software receiving the image processing models, the image processing apparatus can record correspondences between the special effect identifiers and model identifiers of the image processing models.

For example, when the application software obtains the image to be processed and receives the special effect trigger instruction, a special effect identifier carried in the special effect trigger instruction can also be used as a parameter to call the image processing apparatus. The image processing apparatus can first determine a model identifier corresponding to the received special effect identifier as a target model identifier based on the correspondence between the recorded special effect identifiers and the model identifiers. Then, an image processing model corresponding to the target model identifier can be selected to apply the special effect to the image to be processed.

In S120, a target image is output from the image processing model, and the target image comprises a special effect object and a conflicting object corresponding to the special effect object is removed in the target image.

The special effect object may be an added virtual object and the conflicting object may be a real object in the image to be processed. The conflicting object can be an object that degrades a presentation effect of the special effect object. For example, if the special effect object is a virtual double eyelid, a real double eyelid in the image to be processed will affect the presentation effect of the special effect, so the real double eyelid can be a conflicting object corresponding to the special effect object.

The image processing model can learn a correspondence between the special effect object and the conflict object by training during a training stage. Therefore, in a special effect process based on the trained image processing model, the special effect object can be generated in the image to be processed and the conflicting object can be removed to generate the target image after the special effect process.

The image processing model can be trained based on an image with the conflicting object removed and a target object superimposed during a training process in advance. For example, the image processing model can be trained based on an original image and an image obtained by removing the conflicting object from the original image and superimposing the target object.

The target object may comprise an adjustable object having a same presentation effect as the special effect object. For example, the target object can be generated based on a special effect object with a better presentation effect. An image comprising the special effect object can be generated by a generator trained based on a generative adversarial network. The images with the conflicting object removed can also be generated by a generator trained based on a generative adversarial network. Due to a mutual game learning between a generator and a discriminator during a training process of a generative adversarial network, an image generated by the generator obtained by training the generative adversarial network can be more realistic and effective.

Since the target object may be an object that has been adjusted in advance to have a better presentation effect as the special effect object, and the image generated by the generator obtained by training the generative adversarial network have a better authenticity, through training the image processing model based on the target object and the image generated by the generator, the image processed by the trained image processing model has a better authenticity and beautification.

For example, the image processing method can be used in a facial image beautification application, the special effect object comprises a first facial tissue object generated based on the image processing model and the conflicting object comprises a second facial tissue object contained in the image to be processed.

In a case where the application software is a facial image beautification application, the special effect object may be a virtual first facial tissue object generated by the image processing model, and the conflicting object may be a real second facial tissue object contained in the image to be processed. For example, if the special effect object comprises a virtual aegyo sal, the conflicting object may comprise a real aegyo sal, a tear trough, and/or an eye bag, and if the special effect object comprises a virtual double eyelid, the conflicting object comprises a real double eyelid.

In related technologies, an application of special effect data to a facial image results in a special effect that only covers a specific area of the face, making the special effect look very fake. Due to an imprecise positioning, it is also easy to encounter a situation where the special effect cannot produce an expected beautification effect, resulting in poor user experience. That is the special effect can not be accurately applied to the facial image.

In the embodiments of the present disclosure, in a special effect process performed by the image processing apparatus, not only the special effect object is generated, but also the conflicting object is removed that may affect a presentation of the special effect object. During the training process, the image processing apparatus can be trained based on the target object and the image generated by the generator, which can improve the authenticity and beautification of the special effect object generated by the trained image processing model and improve an accuracy of adding the special effect to the facial image, thereby improving the user experience.

Note that the image processing method disclosed in the above embodiment can be performed by an image processing apparatus installed with an application software, and the training process of the image processing model can be performed by a server of the application software. However, in theory, the image processing method and the training process of the image processing model can both be executed by the application software or by the server. Therefore, an execution subject of the image processing method and the training process of the image processing model disclosed above are not a limitation to the execution subject of the image processing method and the training process of the image processing model.

In the image processing method provided in the embodiments of the present disclosure, an image to be processed is input into an image processing model in response to a special effect trigger instruction; a target image is output from the image processing model, the target image comprises a special effect object and a conflicting object corresponding to the special effect object is removed in the target image; the image processing model is trained based on an image with the conflicting object removed and a target object superimposed, wherein the target object comprises an adjustable object having a same presentation effect as the special effect object, and the image with the conflicting object removed is generated by a generator trained based on a generative adversarial network.

The image with the conflicting object removed is generated by the generator trained based on the generative adversarial network and the adjustable target object with the same presentation effect as the special effect object is superimposed onto the image with the conflicting object removed to obtain the image for training the image processing model. Since the target object may be an object that has been adjusted in advance to have a better presentation effect as the special effect object, and the image generated by the generator trained based on the generative adversarial network have a better authenticity, the image processing model trained based on the target object and the image generated by the generator can achieve a better authenticity and beautification of an image processed based on the trained image processing model.

Embodiments of the present disclosure can be combined with various example schemes of the image processing method provided in the above embodiments. The image processing method provided in the embodiments provides a detailed description of the training process of the image processing model. By generating a special effect object based on an original image with a conflicting object removed, a generation effect of the special effect object can be improved to a certain extent, which can improve a presentation effect of the generated target object (such as a special effect mask). Furthermore, by adjusting the target object, such as the special effect mask, to achieve a best presentation effect and superimposing the adjusted target object on an image with the conflicting object removed, a high quality image can be generated for image processing model training. Compared to repeatedly training a generator to obtain better training images, generating the image for image processing model training based on the adjustable target object can shorten time required to generate the image while ensuring a good effect of the image, thereby improving a training efficiency of the image processing model.

Figures 2, 3:
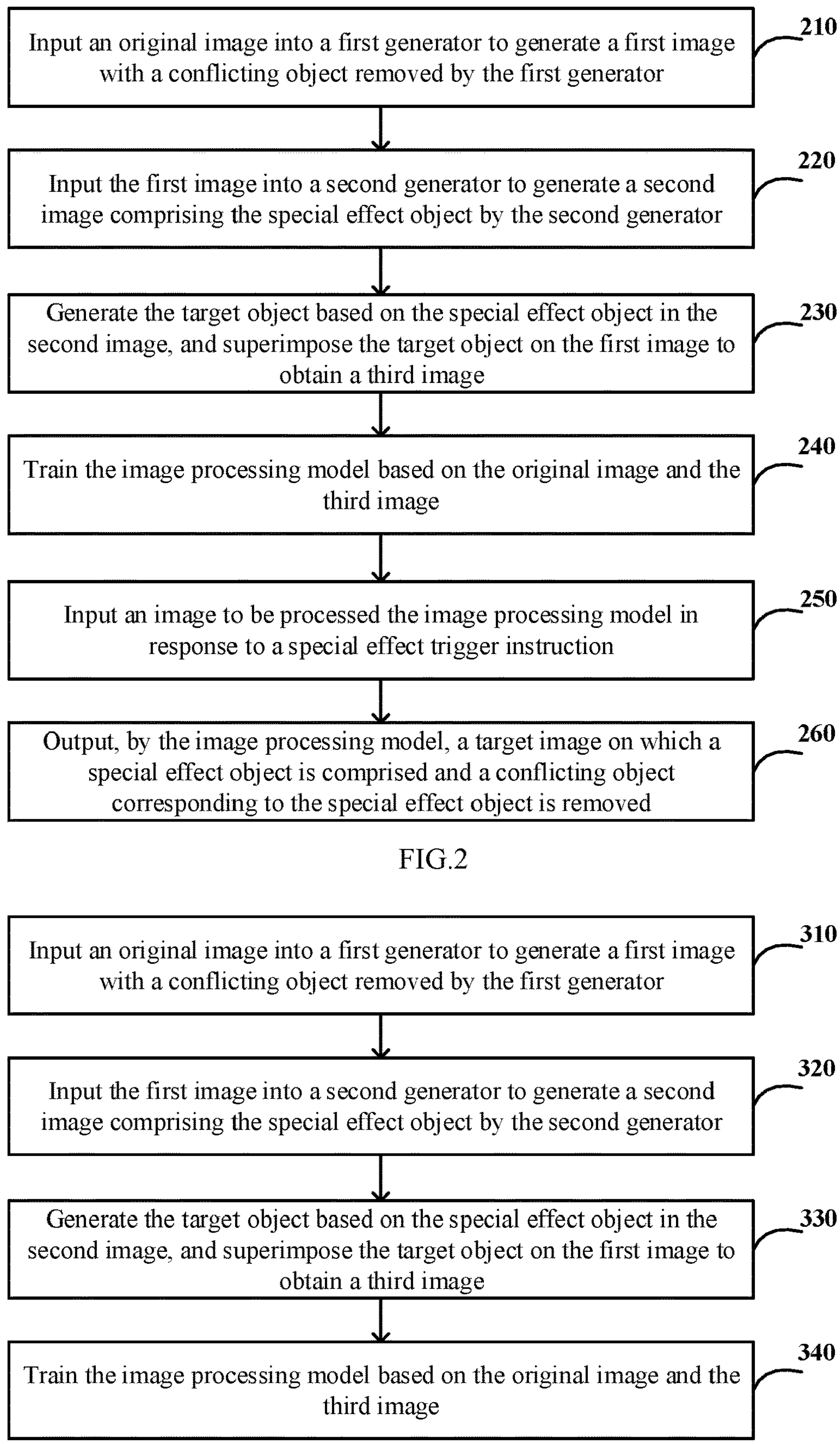
FIG. 2 is a flowchart of an image processing method provided in another embodiment of the present disclosure.
FIG. 3 is a flowchart of a training method for an image processing model provided in an embodiment of the present disclosure.

FIG. 2 is a flowchart of an image processing method provided in an embodiment of the present disclosure. As shown in FIG. 2, the image processing method provided in this embodiment of the present disclosure comprises the following steps.

In S210, an original image is input into a first generator to generate a first image with a conflicting object removed by the first generator.

In this embodiment, the original image may be a random sample image. The original image may be obtained in a number of ways, comprising but not limited to, an image acquisition, a virtual rendering or a network download. For example, assuming that the image processing method is applied to a facial image beautification application, the original image may comprise random facial images taken under different viewing angles/lighting conditions.

The first generator can be comprised in a first generative adversarial network during a training process, and can be trained together with the first generative adversarial network based on a first sample image which is random and a second sample image without the conflicting object.

The first sample image may comprise random sample images which can be the same as images in a sample set comprising the original image. The second sample image can comprise sample images that do not contain the conflicting object. The first sample image and the second sample image can also be obtained by an image acquisition, a virtual rendering, or a network download. For example, assuming that the original image comprises random facial images taken under different viewing angles/lighting conditions, the special effect object is an aegyo sal, and the conflicting object is an eye bag, the first sample image can also comprise random facial images taken under different viewing angles/lighting conditions, while the second sample image can comprise facial images without an eye bag under different viewing angles/lighting conditions.

A process of training the first generator together with the first generation network can comprise: first, inputting the first sample image into the first generator to generate a first output image with the conflicting object removed by the first generator; inputting the second sample image and the first output image into a first discriminator of the first generative adversarial network to enable the first discriminator to make a true-false determination based on these two types of images, wherein a standard discriminant result is that the second sample image is true and the first output image is false; finally, training the first discriminator with a goal of accurately determining true/false of the two types of images, and training the first generator with a goal of making it difficult for the first discriminator to make accurate true/false determinations based on the first output image output by the first generator. Through a game learning of the first generator and the first discriminator, the first generator has a better image processing effect of removing the conflicting object.

For different application scenarios, the first sample image and the second sample image can also be pre-processed before being used for training. A preprocessing may comprise, but is not limited to, a cropping, a rotation, etc. For example, assuming that the special effect object is an aegyo sal and the conflicting object is an eye bag, after obtaining the first sample image and the second sample image, eye regions can be identified and cropped based on facial key points in the images. By using the cropped images for training the generative adversarial network, it is possible to focus on a learning of important eye regions while ignoring other regions, which is beneficial for improving the training effectiveness and efficiency.

By inputting the original image into the trained first generator, the first generator can remove the conflicting object from the original image and generate the first image, from which the conflicting object is removed.

In S220, the first image is input into a second generator to generate a second image comprising the special effect object by the second generator.

In some embodiments, the second generator can be comprised in a second generative adversarial network during the training process, and can be trained together with the second generative adversarial network based on the first sample image and a third sample image comprising the special effect object.

The third sample image can be a sample image that comprise the special effect object. The third sample image can also be obtained by an image acquisition, a virtual rendering, or a network download. For example, assuming that the special effect object is an aegyo sal and the conflicting object is an eye bag, the third sample image may comprise facial images containing an aegyo sal under different viewing angles/lighting conditions.

The process of training the second generator together with the second generation network can comprise: first, inputting the first sample image into the second generator to generate a second output image comprising the special effect object by the second generator; inputting the third sample image and the second output image into a second discriminator of the second generation network to enable the second discriminator to make a true-false determination based on these two types of images, wherein a standard discriminant result is that the third sample image is true and the second output image is false; finally, training the second discriminator with a goal of accurately determining true/false of the two types of images, and training the second generator with a goal of making it difficult for the second discriminator to make accurate true/false determinations based on the second output image output by the second generator. Through a game learning of the second generator and the second discriminator, the second generator has a better image processing effect of generating the special effect object.

In a case of preprocessing the first sample image and the second sample image, the third sample image can be processed using a same preprocessing method, thereby improving the training effectiveness and efficiency of the second generative adversarial network.

Through removing the conflicting object from the original image to generate the first image, and then inputting the first image into the trained second generator, the second image comprising the special effect object can be generated. Through removing the conflicting object and then generating the special effect object on that basis, a generation effect of the special effect object can be improved to a certain extent.

In S230, the target object is generated based on the special effect object in the second image, and the target object is superimposed on the first image to obtain a third image.

In the embodiment, it is possible to generate an adjustable object having a same presentation effect as the special effect object by extracting the special effect object from the second image. By superimposing the target object on the first image, the third image that do not comprise the conflicting object but comprise the special effect object can be obtained.

For example, the target object comprises a special effect mask and the generating the target object based on the special effect object in the second image can comprise obtaining key points of the special effect object in the second image and generating the special effect mask based on the key points.

In an implementation of these examples, the special effect mask (also known as a mask) can be an overlay layer that produces a same effect as the special effect object. The key points of the special effect object in the second image can be extracted using methods such as an Active Shape Model (ASM) algorithm, an Active Appearance Model (AAM) algorithm, a Cascaded Position Regression (CPR) algorithm or a deep learning algorithm. In addition, a shape of the mask (such as a rectangle, a triangle, or an irregular polygon), a grey level of pixels, and other attributes can be specified for an area defined by connecting lines between the key points to create the special effect mask that produces a same effect as the special effect object. For example, after generating a special effect mask based on the key points, the method may further comprise: adjusting the special effect mask based on an adjustment instruction. For example, the superimposing the target object on the first image can comprise superimposing the adjusted special effect mask on the first image.

For example, the adjusting the special effect mask may comprises adjusting a shape, a size, a strength and other attributes of the special effect mask. The strength attribute of the special effect mask can be understood as a transparency attribute of the special effect mask. By further adjusting attributes of the special effect mask based on an adjustment instruction, the special effect mask can be adjusted to achieve the best presentation effect. The third image for training the image processing model is generated based on the special effect mask with the best presentation effect, so that a beautification effect of the image processed by the trained image processing model can be improved. Similarly, a target object other than the special effect mask can also be adjusted and superimposed on the first image to obtain the third image, so that the target object can achieve the best presentation effect.

In S240, the image processing model is trained based on the original image and the third image.

Training the image processing model based on the original image and the third image may comprise: inputting the original image into the image processing model to generate a third output image by the image processing model; training the image processing model with a goal that a deviation between the third output image and the third image is less than a preset deviation. This allows the image processing model to output images with the same presentation effect as those generated based on the generator and the special effect mask.

In addition, the second image generated by the generator can also be used to train the image processing model. However, since the third image is generated based on the generator and the target object, and a presentation effect of the target object can be flexibly adjusted, the generator does not need to be trained repeatedly to obtain a better training image, a training time can be reduced and a training efficiency of the image processing model can be improved.

For example, given an original image A, a first generator G1, and a second generator G2, the training process of the image processing model can be summarized as follows: firstly, generating a first image G1 (A) with a conflicting object is removed based on the first generator G1 and the original image A; secondly, generating a second image G2 (G1 (A)) comprising a special effect object based on the second generator G2 and the first image G1 (A); then, creating a special effect mask for an area of the special effect object based on key points in the second image G2 (G1 (A)); next, adjusting the special effect mask to control the special effect object to achieve the best presentation effect; then, superimposing the adjusted special effect mask on the first image G1 (A) to generate a target image mask (G1 (A)); finally, training the image processing model using the target image mask (G1 (A)) and the original image A.

In S250, an image to be processed is input into the image processing model in response to a special effect trigger instruction.

In S260, a target image is output from the image processing model, and the target image comprises a special effect object and a conflicting object corresponding to the special effect object is removed from the target image.

The image processing model is trained based on an image with the conflicting object removed and a target object superimposed, wherein the target object comprises an adjustable object having a same presentation effect as the special effect object, and the image with the conflicting object removed is generated by a generator trained based on a generative adversarial network.

For example, assuming that the image processing method is applied to a facial image beautification application, after the image processing model is trained, it can also be installed in the facial image beautification application for an online facial image processing by an application software. In addition, the trained first generator and the second generator can also be applied to a facial image beautification application. Compared to using a generator to beautify an image, the image processing model is more compact. Applying the image processing model to an online application can save computing resources and speed up the processing.

The training process of the image processing model utilized in the technical solution of the embodiments of the present disclosure has been described in detail. By removing the conflicting object from the original image, and then generating the special effect object on that basis, the generation effect of the special effect object can be improved to a certain extent, which can improve a presentation effect of the generated target object (such as a special effect mask). Furthermore, by adjusting the target object, such as the special effect mask, to achieve the best presentation effect and superimposing the adjusted target object on the image with the conflicting object removed, a high quality image can be generated for training the image processing model. Compared to repeatedly training a generator to obtain a better training image, generating an image for training the image processing model based on an adjustable target object can shorten time required to generate a training image while ensuring a good effect of the training image, thereby improving a training efficiency of the image processing model.

The image processing method provided by this embodiment of the present disclosure and the image processing method provided by the above embodiment belong to a same inventive concept. For technical details not described in detail in this embodiment, reference can be made to the above embodiment, and this embodiment can achieve a same beneficial effect as the above embodiment.

FIG. 3 is a flowchart of a training method for an image processing model provided in an embodiment of the present disclosure. Embodiments of the present disclosure are applicable to a training process of an image processing model, such as an image processing model for facial image beautification. This method can be performed by a training apparatus for an image processing model, which can be implemented in the form of software and/or hardware. The training apparatus can be provided in an electronic device, such as a server.

As shown in FIG. 3, the training method for the image processing model provided in this embodiment of the present disclosure comprises the following steps.

In S310, an original image is input into a first generator to generate a first image with a conflicting object corresponding to a special effect object removed by the first generator.

In S320, the first image is input into a second generator to generate a second image comprising the special effect object by the second generator.

The first generator and the second generator are trained together with a generative adversarial network.

The first generator is comprised in a first generative adversarial network during the training process, and is trained together with the first generative adversarial network based on a first random sample image and a second sample image without the conflicting object; the second generator is comprised in a second generative adversarial network during the training process, and is trained together with the second generative adversarial network based on the first sample image and a third sample image comprising a special effect object.

In S330, a target object is generated based on the special effect object in the second image, and is superimposed on the first image to obtain a third image, and the target object comprises an adjustable object having the same presentation effect as the special effect object.

The target object may comprise a special effect mask; the generating a target object based on the special effect object in the second image can comprise obtaining key points of the special effect object in the second image and generating the special effect mask based on the key points. The method may further comprise: after generating the special effect mask based on the key points, adjusting the special effect mask based on an adjustment instruction. For example, superimposing the target object on the first image can comprise superimposing the adjusted special effect mask on the first image.

In S340, an image processing model is trained based on the original image and the third image.

Since the target object may be an object that has been adjusted in advance to have a better presentation effect as the special effect object, and the image generated by the generator trained based on the generative adversarial network have a better authenticity, the image processing model trained based on the target object and the image generated by the generator can achieve a better authenticity and beautification of an image processed based on the trained image processing model.

In addition, after the image processing model is trained, the image processing model can also be used to execute the image processing method disclosed in the above embodiment to obtain a target image with a conflicting object removed and comprising a special effect object.

The trained image processing model can be used in a facial image beautification application. The special effect object comprises a first facial tissue object generated based on the image processing model and the conflicting object comprises a second facial tissue object contained in the image to be processed. For example, if the special effect object comprises an aegyo sal, the conflicting object may comprise a real aegyo sal, a tear trough, and/or an eye bag; if the special effect object comprises a double eyelid, the conflicting object comprises a real double eyelid.

In the training method of this embodiment, the original image is input into the first generator to generate the first image with the conflicting object corresponding to the special effect object removed by the first generator; the first image is input into the second generator to generate the second image comprising the special effect object by the second generator. the target object is generated based on the special effect object in the second image, and is superimposed on the first image to obtain the third image and the image processing model is trained based on the original image and the third image. The first generator and the second generator are trained together with the generative adversarial network.

By removing the conflicting object from the original image, and then generating the special effect object on that basis, a generation effect of the special effect object can be improved to a certain extent, which can improve a presentation effect of the generated target object. The target object may be the special effect mask, by adjusting the target object, such as the special effect mask, to achieve the best presentation effect and superimposing the target object on the image with the conflicting object removed, a high quality image can be generated for training the image processing model. Compared to repeatedly training a generator to obtain a better training image, generating an image for model training based on an adjustable target object can shorten the time required to generate a training image while ensuring a good effect of the training image, thereby improving the training efficiency of the image processing model.

The training method provided by this embodiment of the present disclosure and the image processing method provided by the above embodiment belong to a same inventive concept. For the technical details not described in detail in this embodiment, reference can be made to the above embodiment, and this embodiment can achieve a same beneficial effect as the above embodiment.

Figure 4:
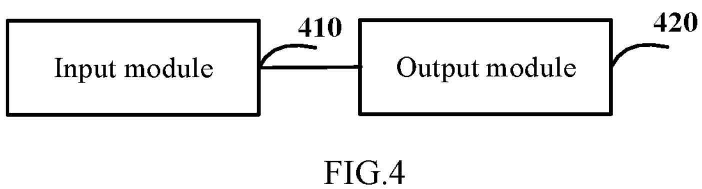
FIG. 4 is a schematic structural diagram of an image processing apparatus provided in an embodiment of the present disclosure.

FIG. 4 is a schematic structural diagram of an image processing apparatus provided in an embodiment of the present disclosure. The image processing apparatus provided in this embodiment of the present disclosure is applicable to a case of image processing, such as a facial image beautification.

As shown in FIG. 4, the image processing apparatus provided in this embodiment comprises:

- an input module 410 configured to input an image to be processed into an image processing model in response to a special effect trigger instruction;
- an output module 420 configured to output a target image from the image processing model, wherein the target image comprises a special effect object and a conflicting object corresponding to the special effect object is removed in the target image.

The image processing model is trained based on an image with the conflicting object removed and a target object superimposed, wherein the target object comprises an adjustable object having a same presentation effect as the special effect object, and the image with the conflicting object removed is generated by a generator trained based on a generative adversarial network.

For example, the image processing apparatus may further comprise:

- a pre-training module configured to train the image processing model based on the following steps:
- inputting an original image into a first generator to generate a first image with the conflicting object removed by the first generator; inputting the first image into the second generator to generate a second image comprising the special effect object by the second generator, generating the target object based on the special effect object in the second image, and superimposing the target object on the first image to obtain a third image; and training the image processing model based on the original image and the third image.

For example, the first generator is comprised in a first generative adversarial network during a training process, and is trained together with the first generative adversarial network based on a first sample image and a second sample image without the conflicting object, wherein the first sample image is random; and the second generator is comprised in a second generative adversarial network during the training process, and is trained together with the second generative adversarial network based on the first sample image and a third sample image comprising the special effect object.

For example, the target object comprises a special effect mask, the pre-training module may be configured to obtain key points of the special effect object in the second image and generate the special effect mask based on the key points.

For example, the pre-training module may be further configured to after generating the special effect mask based on the key points, adjust the special effect mask based on an adjustment instruction and superimpose the adjusted special effect mask on the first image.

For example, the image processing method is applied to a facial image beautification application, and the special effect object comprises a first facial tissue object generated based on the image processing model and the conflicting object comprises a second facial tissue object contained in the image to be processed.

The image processing apparatus provided in this embodiment of the present disclosure can execute the image processing method provided in any embodiment of the present disclosure, and has corresponding functional modules to implement the method and achieve the beneficial effect of the present disclosure.

It should be noted that the units and modules comprised in the above apparatus are only divided according to the functional logic, but are not limited to the above division, as long as corresponding functions can be realized; In addition, specific names of the functional units are only for a convenience of distinguishing from each other, and are not used to limit the protection scope of the embodiments of the present disclosure.

Figure 5:
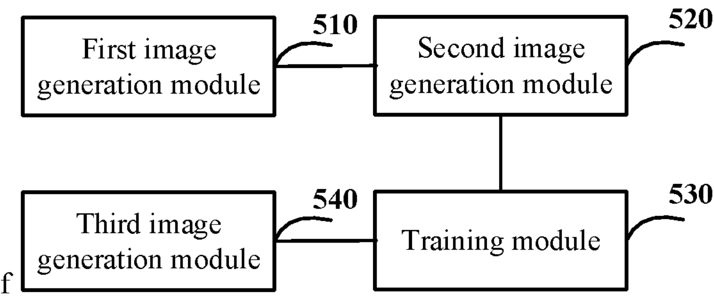
FIG. 5 is a schematic structural diagram of a training apparatus for an image processing model provided in an embodiment of the present disclosure.

FIG. 5 is a schematic structural diagram of a training apparatus for an image processing model provided in an embodiment of the present disclosure. The training apparatus provided in the embodiment of the present disclosure is applicable to the training of an image processing model, such as an image processing model for a facial image beautification.

As shown in FIG. 5, the model training apparatus provided in this embodiment comprises:

- a first image generation module 510 configured to input an original image into a first generator to generate a first image with a conflicting object removed by the first generator, wherein the conflicting object corresponds to a special effect object;
- a second image generation module 520 configured to input the first image into a second generator to generate a second image comprising the special effect object by the second generator;
- a third image generation module 530 configured to generate a target object based on the special effect object in the second image, and superimposing the target object on the first images to obtain a third image, wherein the target object comprises an adjustable object having a same presentation effect as the special effect object;
- a training module 540 configured to train the image processing model based on the original image and the third image.

The first generator and the second generator are trained together with a generative adversarial network.

For example, the first generator is comprised in a first generative adversarial network during a training process, and is trained together with the first generative adversarial network based on a first sample image and a second sample image without the conflicting object, wherein the first sample image is random; and the second generator is comprised in a second generative adversarial network during the training process, and is trained together with the second generative adversarial network based on the first sample image and a third sample image comprising the special effect object.

For example, the target object comprises a special effect mask, the third image generation module may be configured to obtain key points of the special effect object in the second image and generate the special effect mask based on the key points.

For example, the third image generation module may be further configured to after generating the special effect mask based on the key points, adjust the special effect mask based on an adjustment instruction and superimpose the adjusted special effect mask on the first image.

For example, the model training apparatus may further comprise: an image processing model configured to after the training of the image processing model is complete, input an image to be processed into an image processing model in response to a special effect trigger instruction; and output a target image from the image processing model, wherein the target image comprises a special effect object and a conflicting object corresponding to the special effect object is removed in the target image.

For example, the image processing method is applied to a facial image beautification application, and the special effect object comprises a first facial tissue object generated based on the image processing model and the conflicting object comprises a second facial tissue object contained in the image to be processed.

The module training apparatus provided in this embodiment of the present disclosure can execute the training method provided in any embodiment of the present disclosure, and has corresponding functional modules to implement the method and achieve the beneficial effect of the present disclosure.

It should be noted that the units and modules comprised in the above apparatus are only divided according to the functional logic, but are not limited to the above division, as long as corresponding functions can be realized; In addition, specific names of the functional units are only for a convenience of distinguishing from each other, and are not used to limit the protection scope of the embodiments of the present disclosure.

Figure 6:
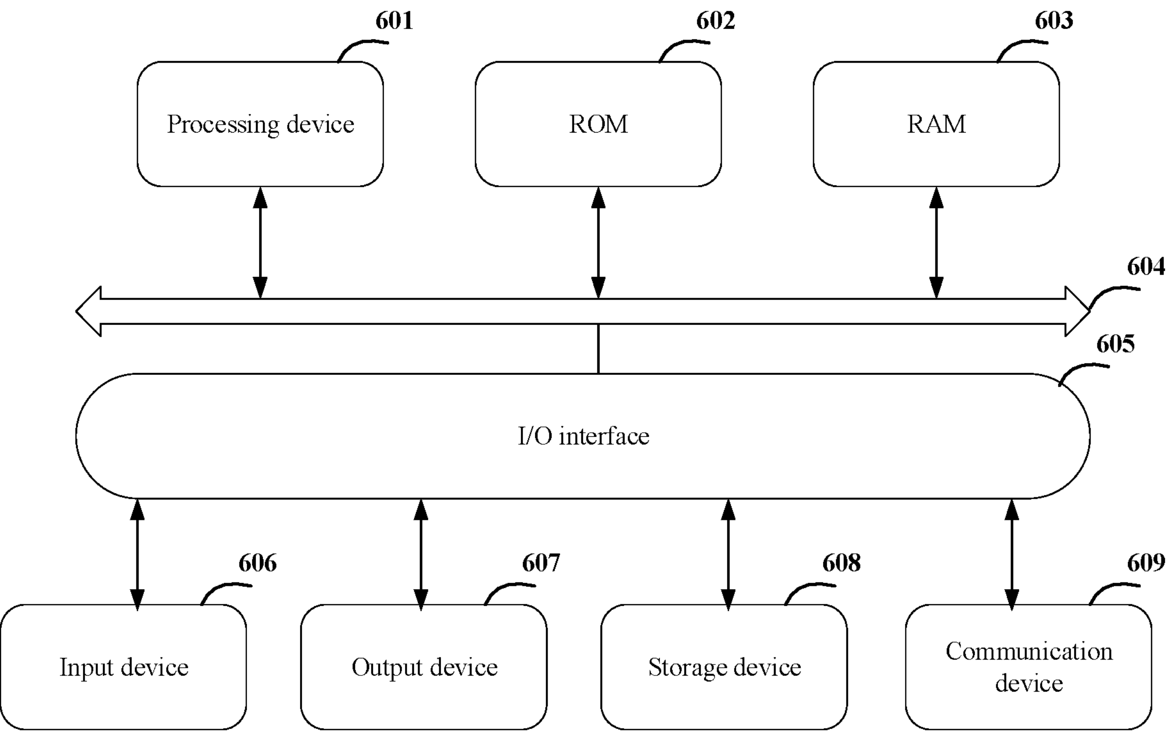
FIG. 6 is a schematic structural diagram of an electronic device provided in an embodiment of the present disclosure.

Referring to FIG. 6, a structural diagram of an electronic device (e.g., a terminal device or server shown in FIG. 6) 600 suitable for implementing an embodiment of the present disclosure is shown. The terminal device of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, and the like. The electronic device shown in FIG. 6 is merely an example and should not impose any limitation on the function and scope of the embodiments of the present disclosure.

As shown in FIG. 6, the electronic device 600 may comprise a processing device (e.g., a central processing unit, a graphics processor) 601, which may perform various appropriate actions and processes according to a program stored in Read Only Memory (ROM) 602 or a program loaded from storage device 606 into Random Access Memory (RAM) 603. In RAM 603, various programs and data required for the operation of the electronic device 600 are also stored. Processing device 601, ROM 602 and RAM 603 are connected to each other through bus 604. An input/output (I/O) interface 605 is also connected to the bus 604.

Generally, the following devices can be connected to I/O interface 605: input devices 606 comprising, for example, a touch screen, a touch pad, a keyboard, a mouse, a camera, a microphone, an accelerometer, a gyroscope, etc; output devices 607 comprising a liquid crystal display (LCD), a speaker, a vibrator, etc.; a storage device 608 such as a magnetic tape, a hard disk, etc; and a communication device 609. The communication device 609 enables the electronic device 600 to communicate wirelessly or wirelessly with other devices to exchange data. Although FIG. 6 shows the electronic device 600 with various components, it should be understood that it is not required to implement or have all of these components. Alternatively, more or fewer components can be implemented or provided.

For example, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 609, or installed from the storage device 608, or from the ROM 602. When the computer program is executed by the processing device 601, the above functions defined in the image processing method or the model training method of the embodiments of the present disclosure are performed.

The electronic device provided by this embodiment of the present disclosure and the image processing method or the training method for the image processing model provided by the above embodiment belong to a same inventive concept. For the technical details not described in detail in this embodiment, reference can be made to the above embodiment, and this embodiment can achieve the same beneficial effect as the above embodiment.

An embodiment of the present application also provides a computer storage medium on which a computer program is stored, the program when executed by a processor implementing the image processing method or the training method for the image processing model provided in the above embodiments.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM) or flash memory (FLASH), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer-readable medium may be comprised in the electronic device described above; or it may exist alone without being assembled into the electronic device.

The computer-readable medium carries one or more programs, which when executed by the electronic device, the electronic device to perform steps of:

inputting an image to be processed into an image processing model in response to a special effect trigger instruction;

outputting a target image from the image processing model, wherein the target image comprises a special effect object and a conflicting object corresponding to the special effect object is removed in the target image, wherein the image processing model is trained based on an image with the conflicting object removed and a target object superimposed, wherein the target object comprises an adjustable object having a same presentation effect as the special effect object, and the image with the conflicting object removed is generated by a generator trained based on a generative adversarial network.

Alternatively, the above computer-readable medium carries one or more programs, which when executed by the electronic device, the electronic device to perform steps of:

inputting an original image into a first generator to generate a first image with a conflicting object removed by the first generator, wherein the conflicting object corresponds to a special effect object; inputting the first image into a second generator to generate a second image comprising the special effect object by the second generator; generating a target object based on the special effect object in the second image, and superimposing the target object on the first images to obtain a third image, wherein the target object comprises an adjustable object having a same presentation effect as the special effect object; and training the image processing model based on the original image and the third image, wherein the first generator and the second generator are trained together with a generative adversarial network.

A computer program code for executing operations of the present disclosure may be complied by any combination of one or more program design languages, the program design languages comprising object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, comprising local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the FIGS. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Wherein, the name of a module does not constitute a limitation of the module itself under certain circumstances, for example, an input module may also be described as "an image input module".

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), and the like.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, [Example 1] provides an image processing method, comprising:

inputting an image to be processed into an image processing model in response to a special effect trigger instruction; and outputting a target image from the image processing model, wherein the target image comprises a special effect object and a conflicting object corresponding to the special effect object is removed in the target image, wherein the image processing model is trained based on an image with the conflicting object removed and a target object superimposed, wherein the target object comprises an adjustable object having a same presentation effect as the special effect object, and the image with the conflicting object removed is generated by a generator trained based on a generative adversarial network.

According to one or more embodiments of the present disclosure, [Example 2] provides an image processing method, further comprising:

For example, the image processing model is trained by:

inputting an original image into a first generator to generate a first image with the conflicting object removed by the first generator;

inputting the first image into a second generator to generate a second image comprising the special effect object by the second generator;

generating the target object based on the special effect object in the second image, and superimposing the target object on the first image to obtain a third image; and training the image processing model based on the original image and the third image.

According to one or more embodiments of the present disclosure, [Example 3] provides an image processing method, further comprising:

For example, the first generator is comprised in a first generative adversarial network during a training process, and is trained together with the first generative adversarial network based on a first sample image and a second sample image without the conflicting object, wherein the first sample image is random; and the second generator is comprised in a second generative adversarial network during the training process, and is trained together with the second generative adversarial network based on the first sample image and a third sample image comprising the special effect object.

According to one or more embodiments of the present disclosure, [Example 4] provides an image processing method, further comprising:

the target object comprises a special effect mask and the generating the target object based on the special effect object in the second image comprises:

obtaining key points of the special effect object in the second image and generating the special effect mask based on the key points.

According to one or more embodiments of the present disclosure, [Example 5] provides an image processing method, further comprising:

For example, the method further comprises: after generating a special effect mask based on the key points, adjusting the special effect mask based on an adjustment instruction, wherein the superimposing the target object on the first image comprises superimposing the adjusted special effect mask on the first image.

According to one or more embodiments of the present disclosure, [Example 6] provides an image processing method, further comprising:

For example, the image processing method is applied to a facial image beautification application, and the special effect object comprises a first facial tissue object generated based on the image processing model and the conflicting object comprises a second facial tissue object contained in the image to be processed.

According to one or more embodiments of the present disclosure, [Example 7] provides a training method for an image processing model, comprising:

inputting an original image into a first generator to generate a first image with a conflicting object removed by the first generator, wherein the conflicting object corresponds to a special effect object;

inputting the first image into a second generator to generate a second image comprising the special effect object by the second generator;

generating a target object based on the special effect object in the second image, and superimposing the target object on the first images to obtain a third image, wherein the target object comprises an adjustable object having a same presentation effect as the special effect object; and training the image processing model based on the original image and the third image, wherein the first generator and the second generator are trained together with a generative adversarial network.

The above description only shows preferred embodiments of the present application and illustrates technical principles applied in the present application. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Since the image processing model is trained based on an image that is generated based on a generator in a generative adversarial network and an adjustable target object, an image output based on the image processing model can achieve a better authenticity and beautification effect.

What is claimed is:

1. An image processing method, comprising:

inputting an image to be processed into an image processing model in response to a special effect trigger instruction; and outputting a target image from the image processing model, wherein the target image comprises a special effect object and a conflicting object corresponding to the special effect object is removed in the target image, wherein the image processing model is trained based on an image with the conflicting object removed and a target object superimposed, wherein the target object comprises an adjustable object having a same presentation effect as the special effect object, and the image with the conflicting object removed is generated by a generator trained based on a generative adversarial network, and the generator comprises a first generator and a second generator, and the image processing model is trained by: inputting an original image into the first generator to generate a first image with the conflicting object removed by the first generator, inputting the first image into the second generator to generate a second image comprising the special effect object by the second generator, generating the target object based on the special effect object in the second image, and superimposing the target object on the first image to obtain a third image, and training the image processing model based on the original image and the third image.

2. The image processing method according to claim 1, wherein:

the generative adversarial network comprises a first generative adversarial network and a second generative adversarial;

the first generator is comprised in the first generative adversarial network during a training process, and is trained together with the first generative adversarial network based on a first sample image and a second sample image without the conflicting object, wherein the first sample image is random; and the second generator is comprised in the second generative adversarial network during the training process, and is trained together with the second generative adversarial network based on the first sample image and a third sample image comprising the special effect object.

3. The image processing method according to claim 1, wherein the target object comprises a special effect mask and the generating the target object based on the special effect object in the second image comprises:

obtaining key points of the special effect object in the second image and generating the special effect mask based on the key points.

4. The image processing method according to claim 3, further comprising: after generating the special effect mask based on the key points, adjusting the special effect mask based on an adjustment instruction, wherein the superimposing the target object on the first image comprises superimposing the adjusted special effect mask on the first image.

5. The image processing method according to claim 1, wherein:

the image processing method is applied to a facial image beautification application, and the special effect object comprises a first facial tissue object generated based on the image processing model and the conflicting object comprises a second facial tissue object contained in the image to be processed.

6. A training method for an image processing model, comprising:

inputting an original image into a first generator to generate a first image with a conflicting object removed by the first generator, wherein the conflicting object corresponds to a special effect object;

inputting the first image into a second generator to generate a second image comprising the special effect object by the second generator;

generating a target object based on the special effect object in the second image, and superimposing the target object on the first images to obtain a third image, wherein the target object comprises an adjustable object having a same presentation effect as the special effect object; and training the image processing model based on the original image and the third image, wherein the first generator and the second generator are trained together with a generative adversarial network.

7. An electronic device, comprising:

one or more processors;

a storage device for storing one or more programs, which when executed by the one or more processors cause the one or more processors to implement the image processing method according to claim 1.

8. The electronic device according to claim 7, wherein:

the generative adversarial network comprises a first generative adversarial network and a second generative adversarial;

the first generator is comprised in the first generative adversarial network during a training process, and is trained together with the first generative adversarial network based on random a first sample image and a second sample image without the conflicting object; and the second generator is comprised in the second generative adversarial network during the training process, and is trained together with the second generative adversarial network based on the first sample image and a third sample image comprising the special effect object.

9. The electronic device according to claim 7, the target object comprises a special effect mask and the generating the target object based on the special effect object in the second image comprises:

obtaining key points of the special effect object in the second image and generating a special effect mask based on the key points.

10. The electronic device according to claim 9, the storage device further comprises a program, which when executed by the one or more processors cause the one or more processors to: adjust the special effect mask based on an adjustment instruction, after generating the special effect mask based on the key points, wherein the superimposing the target object on the first image comprises superimposing the adjusted special effect mask on the first image.

11. The electronic device according to claim 7, wherein:

the image processing method is applied to a facial image beautification application, and the special effect object comprises a first facial tissue object generated based on the image processing model and the conflicting object comprises a second facial tissue object contained in the image to be processed.

12. A non-transitory computer readable storage medium, comprising computer executable instructions, which when executed by a computer processor cause the computer processor to execute the image processing method according to claim 1.

13. The non-transitory computer readable storage medium according to claim 12, wherein:

the generative adversarial network comprises a first generative adversarial network and a second generative adversarial;

the first generator is comprised in the first generative adversarial network during a training process, and is trained together with the first generative adversarial network based on random a first sample image and a second sample image without the conflicting object; and the second generator is comprised in the second generative adversarial network during the training process, and is trained together with the second generative adversarial network based on the first sample image and a third sample image comprising the special effect object.

14. The non-transitory computer readable storage medium according to claim 12, wherein the target object comprises a special effect mask and the generating the target object based on the special effect object in the second image comprises:

obtaining key points of the special effect object in the second image and generating a special effect mask based on the key points.

15. The non-transitory computer readable storage medium according to claim 14, the storage device further comprises a program, which when executed by the one or more processors cause the one or more processors to: adjust the special effect mask based on an adjustment instruction, after generating the special effect mask based on the key points, wherein the superimposing the target object on the first image comprises superimposing the adjusted special effect mask on the first image.

16. The non-transitory computer readable storage medium according to claim 12, wherein:

the image processing method is applied to a facial image beautification application, and the special effect object comprises a first facial tissue object generated based on the image processing model and the conflicting object comprises a second facial tissue object contained in the image to be processed.

17. A electronic device, comprising:

one or more processors;

a storage device for storing one or more programs, which when executed by the one or more processors cause the one or more processors to implement the training method according to claim 6.

18. A non-transitory computer readable storage medium, comprising computer executable instructions, which when executed by a computer processor cause the computer processor to execute the model training method according to claim 6.

* * * * *